United States Patent [19]

Kaneko

[11] Patent Number: 5,645,237
[45] Date of Patent: Jul. 8, 1997

[54] SPINNING REEL FOR FISHING

[75] Inventor: Kyoichi Kaneko, Tokyo, Japan

[73] Assignee: Daiwa Seiko, Inc., Tokyo, Japan

[21] Appl. No.: 275,717

[22] Filed: Jul. 18, 1994

[30] Foreign Application Priority Data

Jul. 26, 1993 [JP] Japan ................................ 5-184031

[51] Int. Cl.$^6$ ............................................. A01K 89/01
[52] U.S. Cl. ................................ 242/224; 242/223
[58] Field of Search .............................. 242/309, 223, 242/224, 593

[56] References Cited

U.S. PATENT DOCUMENTS

| 5,236,147 | 8/1993 | Kaneko | 242/223 |
| 5,345,691 | 9/1994 | Falk et al. | 242/223 |
| 5,395,065 | 3/1995 | Hirose | 242/223 |

FOREIGN PATENT DOCUMENTS

| 63-185515 | 11/1988 | Japan . |
| 1-77905 | 5/1989 | Japan . |
| 5-103567 | 4/1993 | Japan . |

*Primary Examiner*—Katherine Matecki
*Attorney, Agent, or Firm*—Longacre & White

[57] ABSTRACT

A spinning reel for fishing includes a rotor supported rotatably by a reel main body and rotatable responsive to the winding operation of a handle and a fishing line guide device mounted on the rotor for winding the fishing line round a spool responsive to the rotation of the rotor. The spinning reel for fishing comprises transmission means, when the fishing line guide device is switched over to its fishing line play-out position, for emitting ultrasonic waves onto the fishing line to be played out spirally from the spool, receiving means for receiving reflected waves reflected from the fishing line, counting means, in accordance with signals from the transmission and receive means, for counting the number of play-outs of the fishing line to be played out from the spool, calculation means for calculating the play-out length of the fishing line in accordance with the count value obtained in the counting means, and a display part for displaying the calculated play-out length of the fishing line.

5 Claims, 9 Drawing Sheets

SPINNING REEL FOR FISHING

BACKGROUND OF THE INVENTION

1. Field of the Invention

The present invention relates to a spinning reel for fishing and, in more particular, to a spinning reel for fishing which includes a fishing line length measuring device for measuring the length of a fishing line played out from a spool.

2. Description of the Related Art

As means for measuring the play-out length (flying distance) of a fishing line played out from a spinning reel for fishing, conventionally, there is known a fishing line length measuring device which is disclosed in Japanese Utility Model Unexamined Publication No. Sho 63-185515 and Japanese Utility Model Unexamined Publication No. Hei 1-77905.

Figure 13:
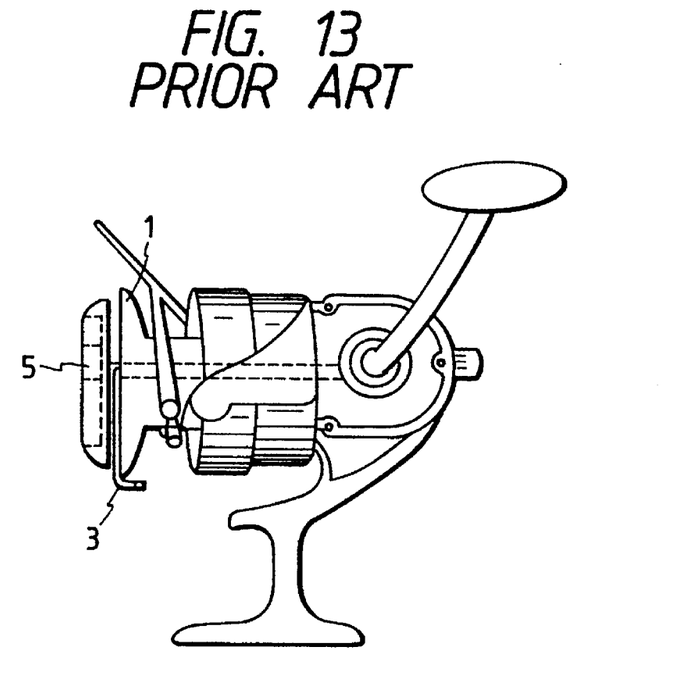
FIG. 13 is a side view of a conventional spinning reel for fishing.
Figure 14:
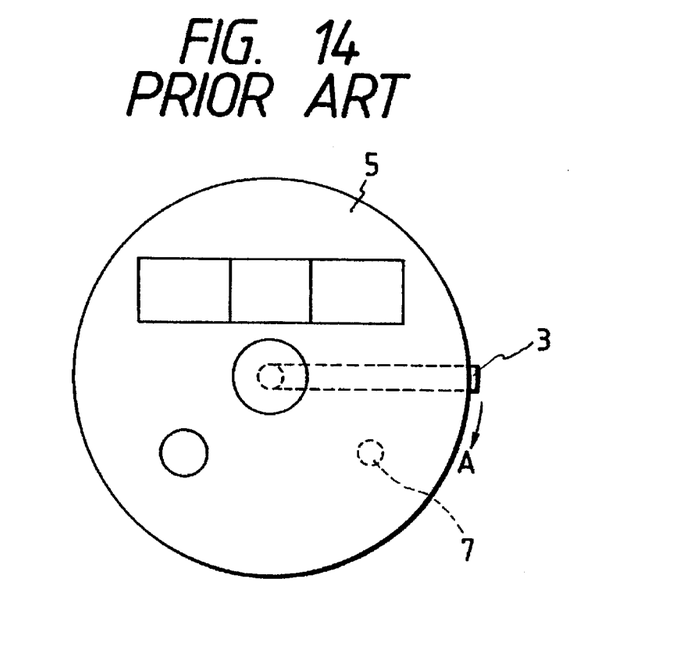
FIG. 14 is a front view of a drag nut.

In the fishing line length measuring device disclosed in Japanese Utility Model Publication No. Sho 63-185515, as shown in FIGS. 13 and 14, a rotary shaft 3 is mounted on the front end of spool 1 such that it can be rotated in a direction of an arrow A, an optical sensor 7 is mounted to a drag nut 5, a fishing line is hitched round the rotary shaft 3 when the fishing line is played out, and the rotation of the rotary shaft 3 is detected by the optical sensor 7 as the fishing line is played out, thereby measuring the played-out length of the fishing line.

Figure 15:
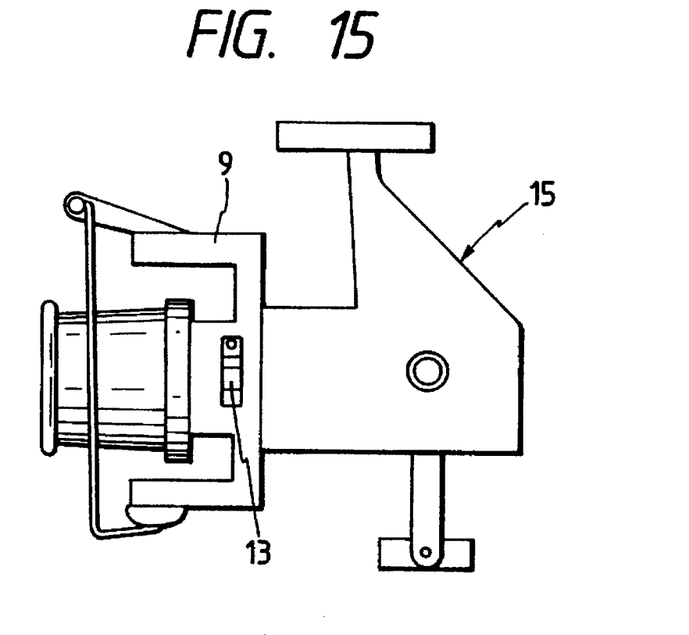
FIG. 15 is a side view of another conventional spinning reel for fishing.
Figure 16:
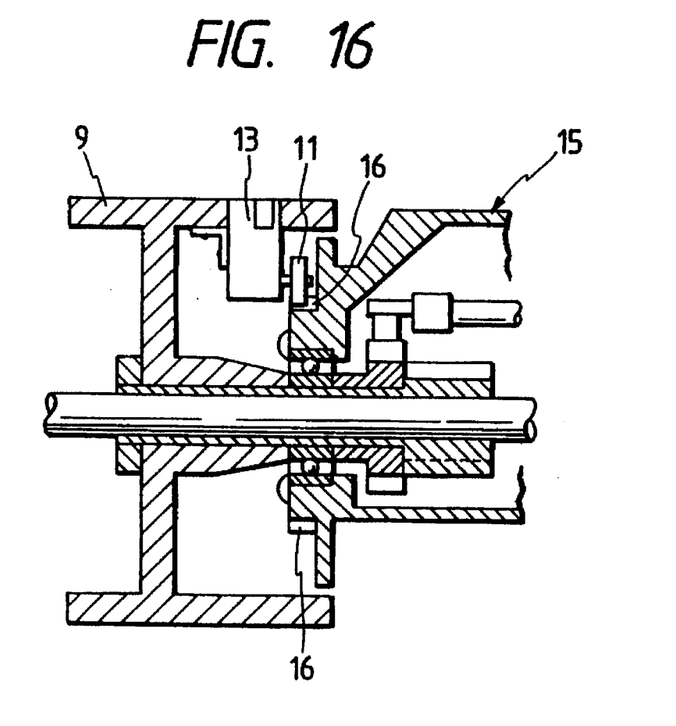
FIG. 16 is a section view of the main portions of the spinning reel for fishing shown in FIG. 15.

Then, in the fishing line length measuring device disclosed in Japanese Utility Model Publication No. Hei 1-77905, as shown in FIGS. 15 and 16, a counter 13 including an input wheel 11 is mounted on a rotor 9, an annular power transmission surface 16 which can be in contact with the input wheel 11 and allows the input wheel 11 to rotate about its own axis and revolve about the shaft of the rotor 9 when the rotor 9 is rotated is provided in the front portion of a reel main body 15, and the number of revolutions of the rotor 9 when the fishing line is wound round the reel main body 15 is detected by the counter 13, thereby measuring the played-out length of the fishing line.

However, in the former conventional fishing line length measuring device, since the rotary shaft 3 is rotated by the fishing line when it is played out, great resistance is applied to the fishing line, which makes it impossible to play out the fishing line a long distance. Moreover, if the fishing line is played out suddenly, then the fishing line can be cut off.

Also, generally, in this type of spinning reel, the rotor is not rotated when the fishing line is played out. Therefore, in the latter conventional fishing line length measuring device which measures the length of the fishing line by detecting the number of revolutions of the rotor 9 by use of the counter 13, the play-out distance of the fishing line cannot be measured when the fishing line is played out.

Further, even when the fishing line length is measured when it is wound, since the diameters of fishing lines vary according to the kinds of the fishing lines, the fishing line length cannot be measured accurately simply by detecting the number of revolutions of the rotor 9.

SUMMARY OF THE INVENTION

The present invention aims at eliminating the drawbacks found in the above-mentioned conventional fishing line length measuring devices. Accordingly, it is an object of the invention to provide a spinning reel for fishing including a fishing line length measuring device which is capable of playing out a fishing line smoothly and measuring the play-out length of the fishing line.

In attaining the above object, according to a first aspect of the invention, there is provided a spinning reel for fishing including a rotor supported rotatably by a reel main body and rotatable responsive to the winding operation of a handle, and a fishing line guide device mounted on the rotor for winding a fishing line round a spool with the rotation of the rotor, the spinning reel comprising: transmission means, when the fishing line guide device is switched over to its fishing line play-out positions, for emitting ultrasonic waves onto the fishing line which is played out spirally from the spool; receive means for receiving reflected waves reflected from the fishing line; counting means, in accordance with signals from the transmission means and receiving means, for counting the number of play-outs of the fishing line played out spirally from the spool; calculation means, in accordance with the count values in the counting means, for calculating the play-out length of the fishing line; and a display part for displaying the calculated play-out length of the fishing line.

According to a second aspect of the invention, there is provided a spinning reel for fishing including a rotor supported rotatably by a reel main body and rotatable responsive to the winding operation of a handle, and a fishing line guide device mounted on the rotor for winding a fishing line round a spool responsive to rotation of the rotor, the spinning reel comprising: transmission means for emitting ultrasonic waves onto the surface of a fishing line winding diameter portion of the spool; receiving means for receiving reflected waves reflected from the surface of the fishing line winding diameter portion; time clocking means for clocking time required from when the ultrasonic waves are emitted from the transmission means to when the reflected waves are received by the receiving means; fishing line winding diameter detect means for converting the time clocked by the time clocking means into an electric signal proportional to the fishing line winding diameter; revolution number detect means for detecting the number of revolutions of the rotor; calculation means for calculating the play-out length of the fishing line in accordance with the detected value from the revolution number detect means and the fishing line winding diameter data from the fishing line winding diameter detect means; and a display part for displaying the calculated play-out length of the fishing line.

In a spinning reel for fishing according to the first aspect of the invention, if the ultrasonic waves are emitted from the transmission means onto the fishing line which is played out spirally from the spool, then the reflected waves reflected from the fishing line are received by the receiving means and the number of play-outs of the fishing line is counted by the counting means.

The calculation means calculates the play-out length of the fishing line in accordance with the count value and the calculated value is displayed on the display part as the play-out length of the fishing line.

Also, in a spinning reel for fishing according to the second aspect of the invention, if the ultrasonic waves are emitted from the transmission means onto the surface of the fishing line winding diameter portion of the spool and the reflected waves reflected from the winding diameter portion are received by the receiving means, then the time taken until the ultrasonic waves emitted from the transmission means are received by the receiving means is clocked by the time clocking means.

Then, the time clocked by the time clocking means is converted into an electric signal proportional to the fishing line winding diameter by the fishing line winding diameter detect means, the play-out length of the fishing line is calculated in accordance with the fishing line winding diameter data and the detected value from the revolution number detect means by the calculation means, and the calculated value is displayed on the display part as the play-out length of the fishing line.

The above and other objects and features of the present invention will be more apparent from the following description taken in conjunction with the accompanying drawings.

DETAILED DESCRIPTION OF THE PREFERRED EMBODIMENTS

Description will be given hereinbelow in detail of the embodiments of the invention with reference to the accompanying drawings.

Figure 1:
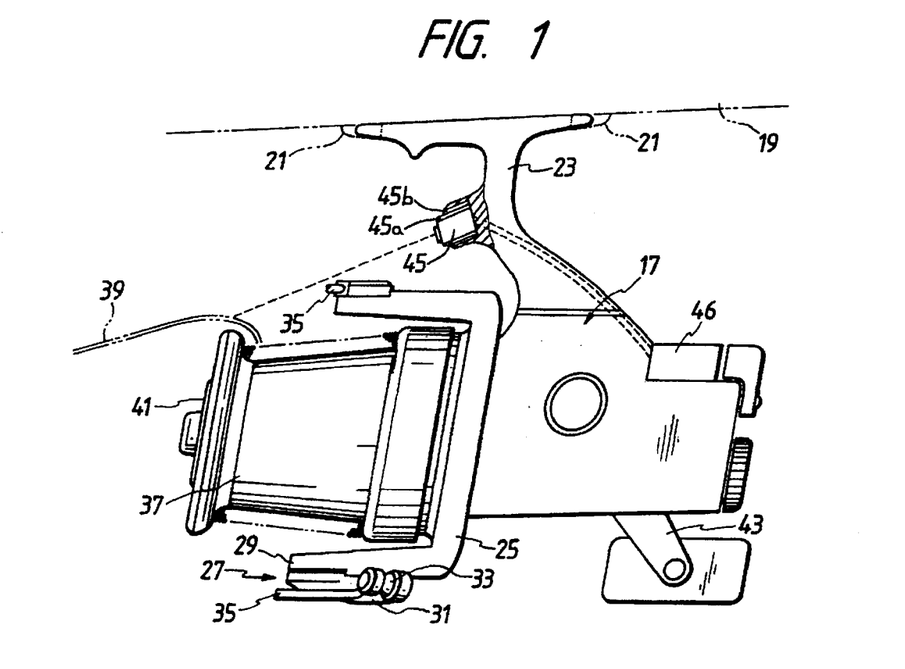
FIG. 1 is a partially broken side view of a spinning reel for fishing according to a first embodiment of the invention.
Figure 2:
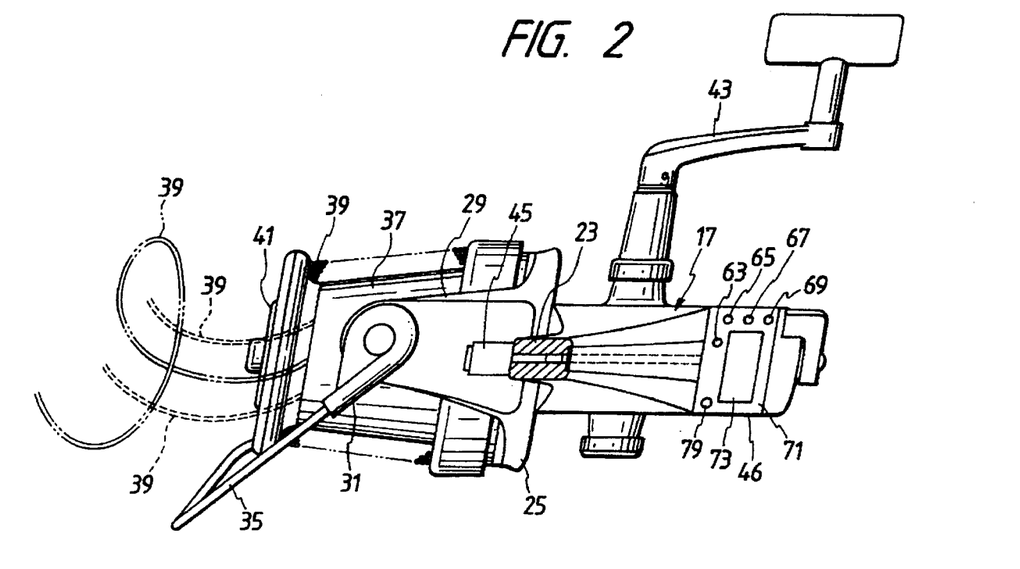
FIG. 2 is a partially broken plan view of the spinning reel for fishing shown in FIG. 1.

FIGS. 1 and 2 show a spinning reel for fishing according to a first embodiment of the invention. In these figures, reference character 17 designates a reel main body which is mounted on a seat portion 21 of a fishing rod 19 through a mounting leg 23. Similarly to the prior art, a rotor 25 is rotatably journaled in the front end portion of the reel main body 17 and a fishing line guide device 27 is mounted on the rotor 25.

As well known, the fishing line guide device 27 includes a bail support arm 29 formed integrally with the rotor 25, a bail support member 31 mounted rotatably on the bail support arm 29 through a support shaft, and a bail 35 fixed to the bail support member 31 via a line roller 33.

And, as shown in FIG. 1, if the fishing line guide device 27 is switched over to its fishing line play-out position and a lure (not shown) is cast toward a fishing point while swinging down the fishing rod 19, then a fishing line 39 wound round a spool 37, as shown in FIGS. 1 and 2, is sequentially played out spirally from the spool 37 with the flight of the lure toward the fishing point.

The spool 37 is supported rotatably by a spool shaft (not shown) mounted traversably on the reel main body 17 and is disposed in the front end portion of the reel main body 17 concentrically with the rotor 25. And the spool 37 and spool shaft are frictionally connected to each other by a drag device 41 provided in the front end portion of the spool 37, and the frictional connecting force (drag force) can be adjusted arbitrarily by the drag device 41.

Reference character 43 designates a handle which is mounted rotatably to the reel main body 17 for winding the fishing line. The rotary shaft (not shown) of the handle 43 and rotor 25 are connected to each other through a well-known gear mechanism (not shown) provided in the reel main body 17, and the spool shaft and the rotary shaft of the handle 43 are connected to each other through a well-known traverse mechanism (not shown).

In addition to the above-mentioned conventional structure, the spinning reel for fishing according to the present embodiment includes a fishing line length measuring device for measuring the play-out length of the fishing line 39 played out from the spool 37.

In other words, 45 stands for an ultrasonic sensor which is mounted on the mounting leg 23. The ultrasonic sensor 45 serves not only as transmission means which emits an ultrasonic beam onto the fishing line 39 to be played out spirally from the spool 37 when the fishing line 39 is played out, but also as receiving means which receives reflected waves reflected by the fishing line 39. And the ultrasonic sensor 45 is disposed at a given angle toward the leading end of the spool 37 so that it can surely receive the reflected waves. As shown in FIG. 1, a resonating member 45a formed of urethane foam and a shield member 45b formed of a flexible substrate for preventing noise coming from externally are wound round the outer periphery of the ultrasonic sensor 45 in the preferred embodiment.

And the reception signal of the ultrasonic sensor 45 is input to a control mechanism provided in a control mechanism storage member 46 which is disposed in the rear of the reel main body 17.

Figure 3:
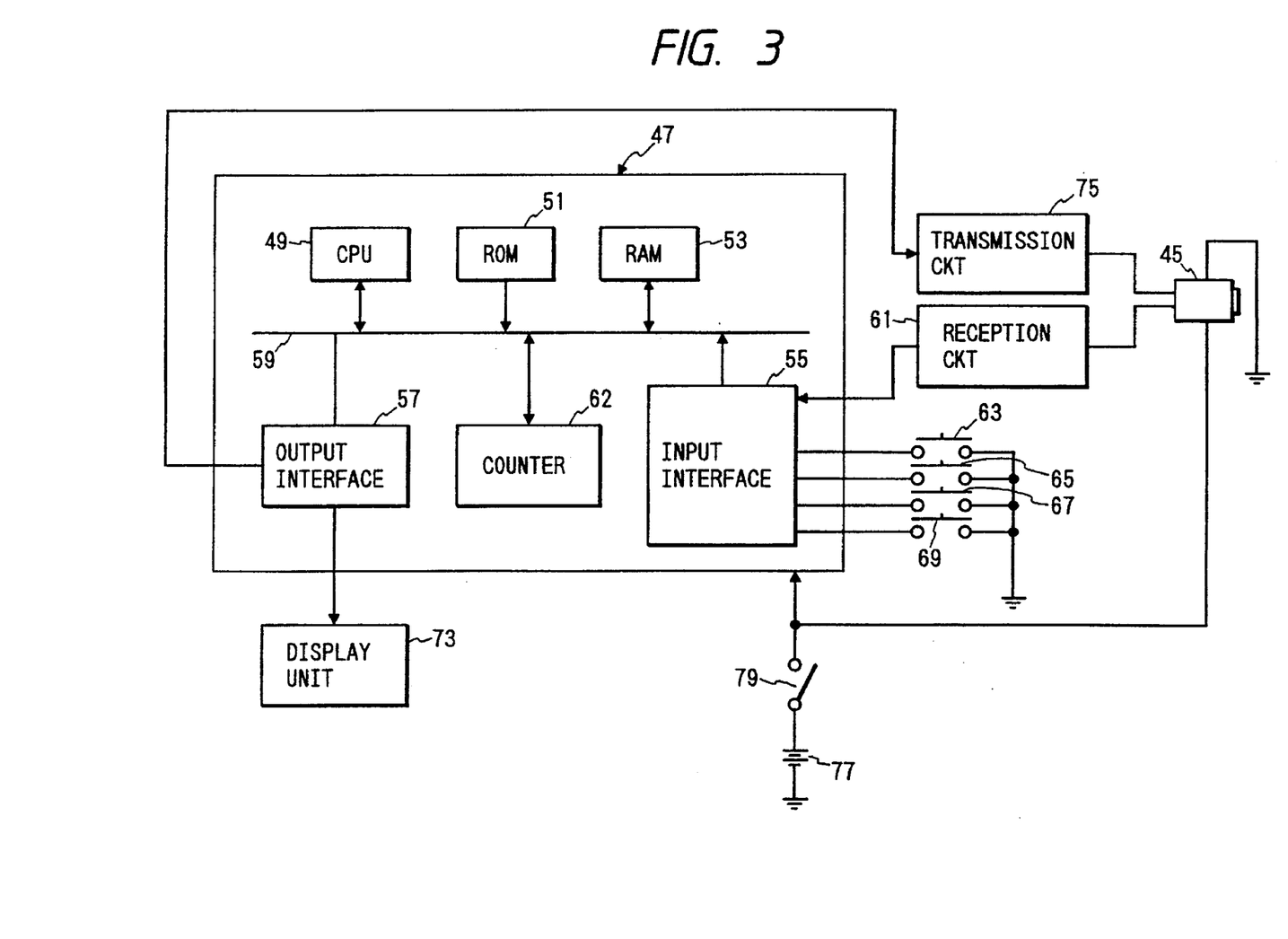
FIG. 3 is a block diagram of a control mechanism employed in the spinning reel for fishing according to the first embodiment of the invention.

Now, FIG. 3 shows a block diagram of the control mechanism and, in FIG. 3, reference numeral 47 designates a microcomputer which controls the fishing line length calculation, fishing line length display, fishing line length data writing and similar operations. That is, the microcomputer 47 includes a CPU 49 which controls and manages a program memory, a data memory and an input/output device to execute an operation necessary to process jobs given thereto, a judging operation, and a transfer processing, a ROM 51 which stores therein operation processing programs to be executed by the CPU 49 and the like, a RAM 53 which stores therein input data and the results of the operations executed by the CPU 49 and the like, an input interface 55, and an output interface 57. And these components are respectively connected to the CPU 49 through a bus 59.

The ultrasonic sensor 45 is connected through a receive circuit 61 to the input interface 55. That is, if an ultrasonic beam emitted from the ultrasonic sensor 45 is reflected by the fishing line 39 played out from the spool 37 and the reflected wave is then received by the ultrasonic sensor 45, then the reception signal of the sensor 45 is transmitted through the input interface 55 to the CPU 49, while the number of the reception signals is counted by a counter 62 which is incorporated in the microcomputer 47.

Further, to the input interface 55, there are connected a mode switching switch 63 for switching the microcomputer 47 over to a fishing line diameter input mode and a fishing line length measuring mode, a set switch 65 for inputting a fishing line diameter, a reset switch 67 for resetting a fishing line length display in the fishing line length measuring mode to zero, and an on/off mode switch for on/off controlling other components than the internal circuits of the microcomputer 47. These switches 63, 65, 67 and 69, as shown in FIG. 2, are respectively disposed on an operation panel 71 for the control mechanism storage member 46.

On the other hand, to the output interface 57, there are connected a display unit 73 for displaying the fishing line length digitally, and the ultrasonic sensor 45 through a transmission circuit 75. In this structure, if a signal indicating measurement is input from the CPU 49 to the transmission circuit 75, then an ultrasonic beam is emitted from the ultrasonic sensor 45 toward the fishing line 39.

Further, in FIG. 3, 77 designates a power source and 79 stands for a source switch.

Figure 4:
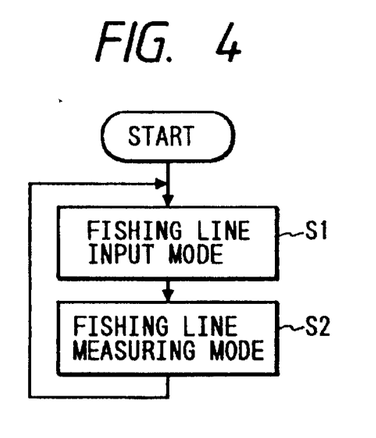
FIG. 4 is a flow chart showing a mode switching procedure.
Figure 5:
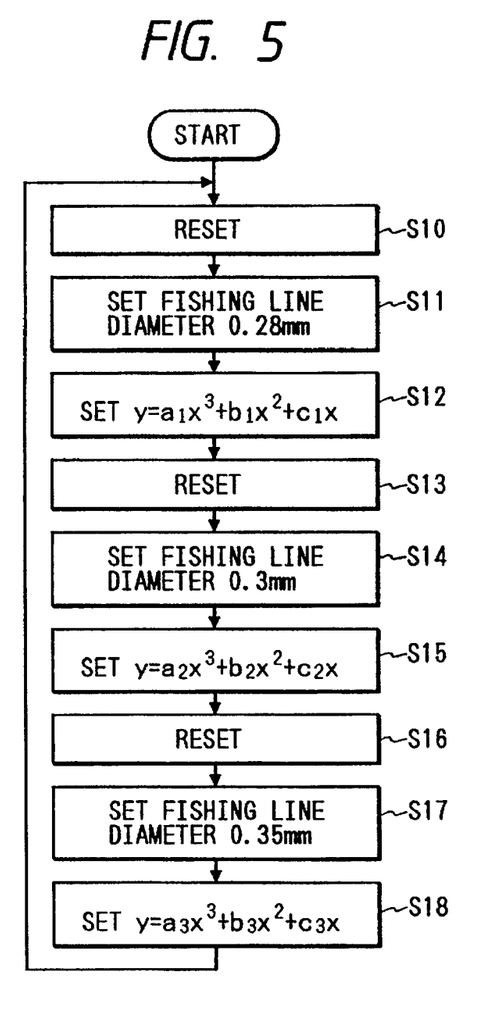
FIG. 5 is a flow chart showing a fishing line diameter input procedure.
Figure 6:
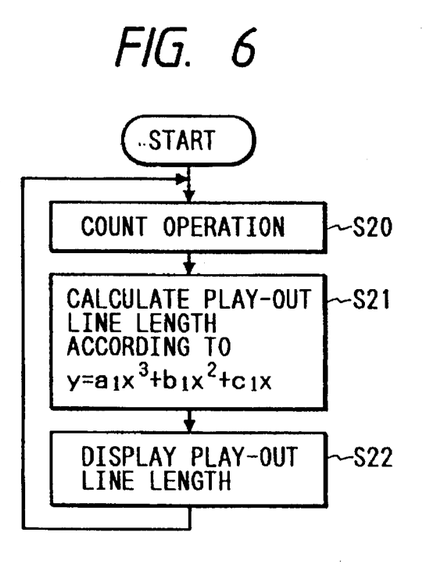
FIG. 6 is a flow chart showing a fishing line play-out length measuring procedure.

Now, FIG. 4 shows a mode switching procedure to be performed by means of operation of the mode switching switch 63, FIG. 5 shows a fishing line diameter input procedure, and FIG. 6 shows a fishing line length measuring procedure. Programs respectively corresponding to these procedures are stored in the ROM 51 of the microcomputer 47.

The spinning reel for fishing according to the present embodiment is structured in this manner and, next, description will be given below of the operation of the present spinning reel.

At first, if the source switch 79 is turned on, then the microcomputer 47 is started. And, in this condition, if the mode switching switch 63 is pushed intermittently and sequentially, then the microcomputer 47 is switched sequentially to a fishing line diameter input mode shown in Step S1 in FIG. 4 and a fishing line length measuring mode shown in Step S2 in FIG. 4.

These Steps S1 and S2 are performed cyclically by operating the mode switching switch 63, which is referred to as a normal mode. In the normal mode, if the on/off mode switch 69 is pushed once, then the mode is switched over to an off mode in which no inputs can be received; and if the on/off mode switch is pushed again, then the mode is returned to one of the normal modes before an off mode.

In this manner, if the microcomputer 47 is set into the fishing line diameter input mode, then, simultaneously with this, the microcomputer 47 is enabled to specify the fishing line diameter, which in turn makes it possible to execute a fishing line diameter input processing routine shown in FIG. 5 by means of repetitive on operations of the set switch 65.

In the fishing line diameter input processing routine shown in FIG. 5, if the set switch 65 is operated on repeatedly, then Steps S10 to S12, Steps S13 to S15, and Steps S16 to S18 are executed cyclically in each of the on operations, so that, for example, three kinds of fishing line diameters 0.28 mm, 0.30 mm, and 0.35 mm are displayed and fishing line operation expressions respectively corresponding to the diameters are set.

At first, if the first on operation of the set switch 65 is performed, then in Step S10 the display unit 73 and a fishing line length operation expression set are reset and, next, a fishing line diameter 0.28 mm display processing shown in Step S11 is executed.

That is, data on a fishing line diameter of 0.28 mm is read out from the ROM 51 and the data is also output through the output interface 57 to the display unit 73, where a numerical value "0.28" is displayed. And the processing advances to Step S12, in which a calculation expression $y=a_1x^3+b_1x^2+c_1x$ (where, y: fishing line play-out length, x: number of play-outs of fishing line) suitable for measurement of the play-out length of a fishing line having a diameter of 0.28 mm is set and, at the same time, the constants $a_1$, $b_1$ and $c_1$ in the first, second and third terms of the expression are set. These constants $a_1$, $b_1$ and $c_1$ are suitable for measurement of the length of the fishing line having a diameter of 0.28 mm, and these constants and the cubic expression are stored in the ROM 51. And, if the on operation of the set switch 65 is ended once, then there are selected a fishing line diameter of 0.28 mm and an operation expression on the length of a fishing line having a diameter of 0.28 mm.

Also, if the set switch 65 is pushed another time, then the processing advances to Step S13, in which the display of "0.28" set in the display unit 73 when the set switch 65 was operated first is reset and the fishing line length operation expression corresponding to such display is also reset.

Then, the processing advances to Step S14, in which a display processing on a fishing line diameter of 0.30 mm is executed. That is, data on the fishing line diameter of 0.30 mm is read out from the ROM 51 and the data is output through the output interface 57 to the display unit 73, whereby a numerical value "0.30" is displayed on the display unit 73. Next, the processing goes to Step S15, in which a calculation expression $y=a_2x^3+b_2x^2+c_1x$ suitable for measurement of the play-out length of a fishing line having a diameter of 0.30 mm is set and, at the same time, the constants $a_2$, $b_2$ and $c_2$ respectively in the first, second and third terms of the calculation expression are set.

If the set switch 65 is pushed further, then the processing advances to Step S16, in which the display and fishing line length calculation expression respectively set in the second pushing of the set switch 65 are reset. After then, the processing goes to a next step S17, in which display of a fishing line diameter of 0.35 mm is executed. On completion of this fishing line diameter display processing, the processing advances to Step S18, in which a calculation expression $y=a_3x^3+b_3x^2+c_3x$ suitable for measurement of the play-out length of a fishing line having diameter of 0.35 mm is set and, at the same time, the constants $a_3$, $b_3$ and $c_3$ respectively in the first, second and third terms of the calculation expression are set.

Therefore, when the diameter of the fishing line 39 wound round the spool 37 is displayed on the display unit 73, if the on operation of the set switch 65 is stopped, then a fishing line length calculation expression corresponding to the fishing line diameter displayed on the display unit 73 is set and, in accordance with the fishing line length calculation expression, the play-out length of the fishing line 39 is calculated.

Next, description will be given below of the operation to measure the play-out length of the fishing line 39 with reference to a flow chart shown in FIG. 6.

In actual fishing, the mode switching switch 63 is operated to set the microcomputer 47 in the fishing line length measuring mode. Responsive to this, for example, a character "DIST." is lighted on the display unit 73 to thereby display that the current mode is the fishing line length measuring mode.

In this state, if the fishing rod 19 is cast down to thereby throw a lure connected to the fishing line 39 at the rod leading end toward a fishing point, then the fishing line 39 wound round the spool 37 is sequentially played out spirally as shown in FIG. 2, as the lure is flown toward the fishing point.

As a result of this, the measuring processing program is started. And, if an ultrasonic beam emitted from the ultrasonic sensor 45 is reflected by the fishing line 39 played out from the spool 37 and its reflected wave is received by the ultrasonic sensor 45, then the reception signal is input through the input interface 55 into the CPU 49, while the number of the reception signals is counted by the counter 62 incorporated in the microcomputer 47 (Step S20).

Then, the processing goes to Step S21, in which the counting contents of the counter 62 are input and, in accordance with the input count values, the play-out length of the fishing line is operated or calculated according to the calculation expression $y=a_1x^3+b_1x^2+c_1x$. In this case, it is assumed that the diameter of the fishing line used is 0.28 mm. And the processing advances to Step S22, in which the fishing line length calculated is displayed digitally on the display unit 73. On completion of the processing in Step S22, the processing is returned again to Step S20 and, after then, the processings in Steps S21 and S22 are executed and the display contents on the display unit 73 are varied according to the calculated play-out fishing line lengths each time when the processings in Steps S21 and S22 are executed. In this case, the display values display values of the display unit 73 are varied in a unit of 1 m. And, if the lure lands on the water and the play-out of the fishing line is stopped, then the fishing line length obtained at the time when the play-out of the fishing line is stopped is displayed on the display unit 73. For example, if the display value is "50", then it indicates that the fishing line 39 has been played out 50 m from the spool 37 and, at the same time, it shows that the lure thrown point is about 50 m off from the shore.

And, when fish bites the lure, similarly to the conventional spinning reel, if the bail support member 31 of the fishing line guide device 27 is moved from the fishing line play-out position to the fishing line winding position and the handle 43 is operated for winding, then the fishing line 39 is wound round the spool 37 by the fishing line guide device 27 due to the rotation of the rotor 25.

As described above, according to the present embodiment, since a fishing line length calculation expression suitable for a fishing line diameter is selected every fishing line diameter and the play-out length of a fishing line can be measured or calculated in accordance with the selected calculation expression, when compared with the conventional spinning reels as shown in FIGS. 13 to 16, the fishing line length can be measured accurately even if the fishing line diameters are different according to the kinds of the fishing line 39, thereby being able to improve the accuracy with which the play-out length of the fishing line 39 is measured.

Moreover, according to the present embodiment, since no resistance is applied to the fishing line 39 when the fishing line 39 is played out, the fishing line 39 can be played out smoothly.

In the above-mentioned first embodiment of the invention, the play-out length of the fishing line 39 based on the number of play-outs thereof is found according to a cubic fishing line length calculation expression. However, the play-out length can also be found according to a quadratic expression and, in this case, operation burdens on the microcomputer 47 can be reduced.

Also, the fishing line input data are not limited to the illustrated three kinds.

Figure 7:
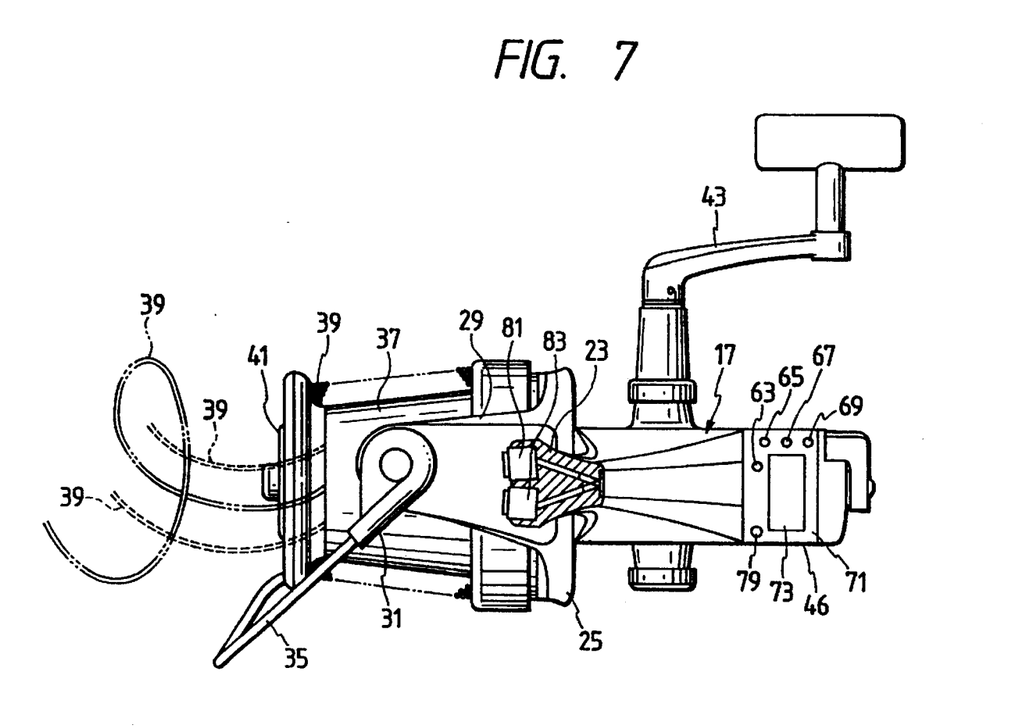
FIG. 7 is a partially broken plan view of a spinning reel for fishing according to a second embodiment of the invention.

Further, in the above first embodiment, a single ultrasonic sensor 45 is used not only as transmission means for emitting an ultrasonic beam onto the fishing line 39 but also as receiving means for receiving the reflected wave from the fishing line 39. However, this is not limitative but, as shown in FIG. 7, there may be provided separately an ultrasonic sensor 81 serving as transmission means for emitting an ultrasonic beam onto the fishing line 39 and an ultrasonic sensor 83 serving as receiving means for receiving the reflected wave from the fishing line 39, and the two ultrasonic sensors 81 and 83 may be mounted to the mounting leg 23.

Figure 8:
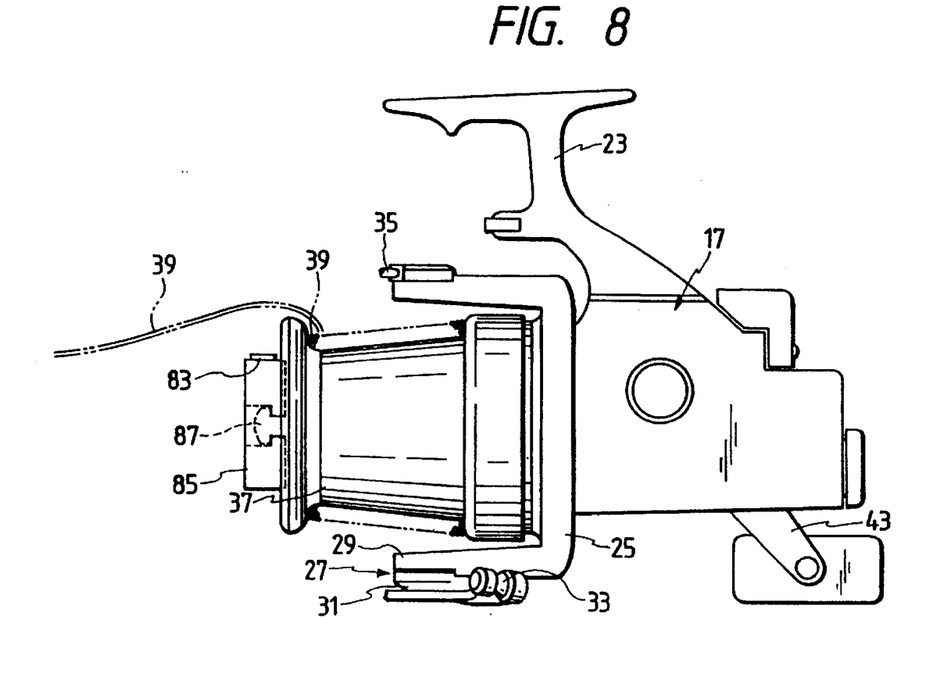
FIG. 8 is a side view of a spinning reel for fishing according to a third embodiment of the invention.
Figure 9:
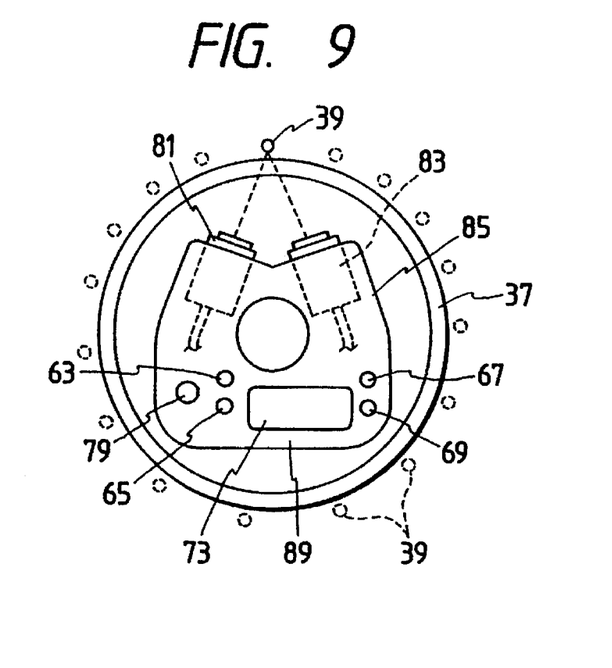
FIG. 9 is a front view of a control mechanism storage device.

Further, as shown in FIGS. 8 and 9, a control mechanism storage member 85 for storing a control mechanism shown in FIG. 8 is mounted through a mounting member 87 on the leading end portion of a spool shaft (not shown) supporting the spool 37, ultrasonic sensors 81, 83 are mounted on one side portion of the control mechanism storage member 85, and, on the operation panel 89 of the storage member 85, there may be provided the display unit 73, mode switching switch 63, set switch 65, reset switch 67, on/off mode switch 69, and source switch 79.

In order that the reflected wave of an ultrasonic beam emitted from the ultrasonic sensor 81 for transmission can be received well by the ultrasonic sensor 83 for reception, the two ultrasonic sensors 81, 83 are respectively disposed substantially in a V shape with respect to the fishing line 39 to be played out.

Accordingly, according to the above-mentioned second and third embodiment as well, similarly to the first embodiment, the expected object of the invention can be achieved.

Figure 10:
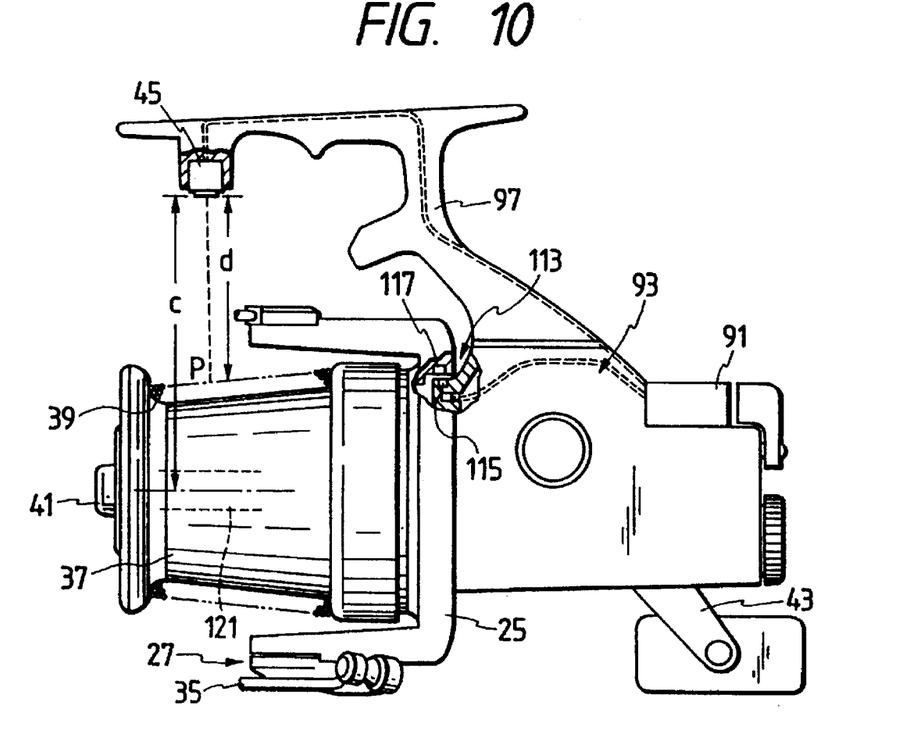
FIG. 10 is a side view of a spinning reel for fishing according to a fourth embodiment of the invention.

Now, FIG. 10 shows a fourth embodiment of a spinning reel according to the invention. In FIG. 10, the same parts as those employed in the first embodiment are given the same reference characters and the description thereof is omitted here.

Figure 11:
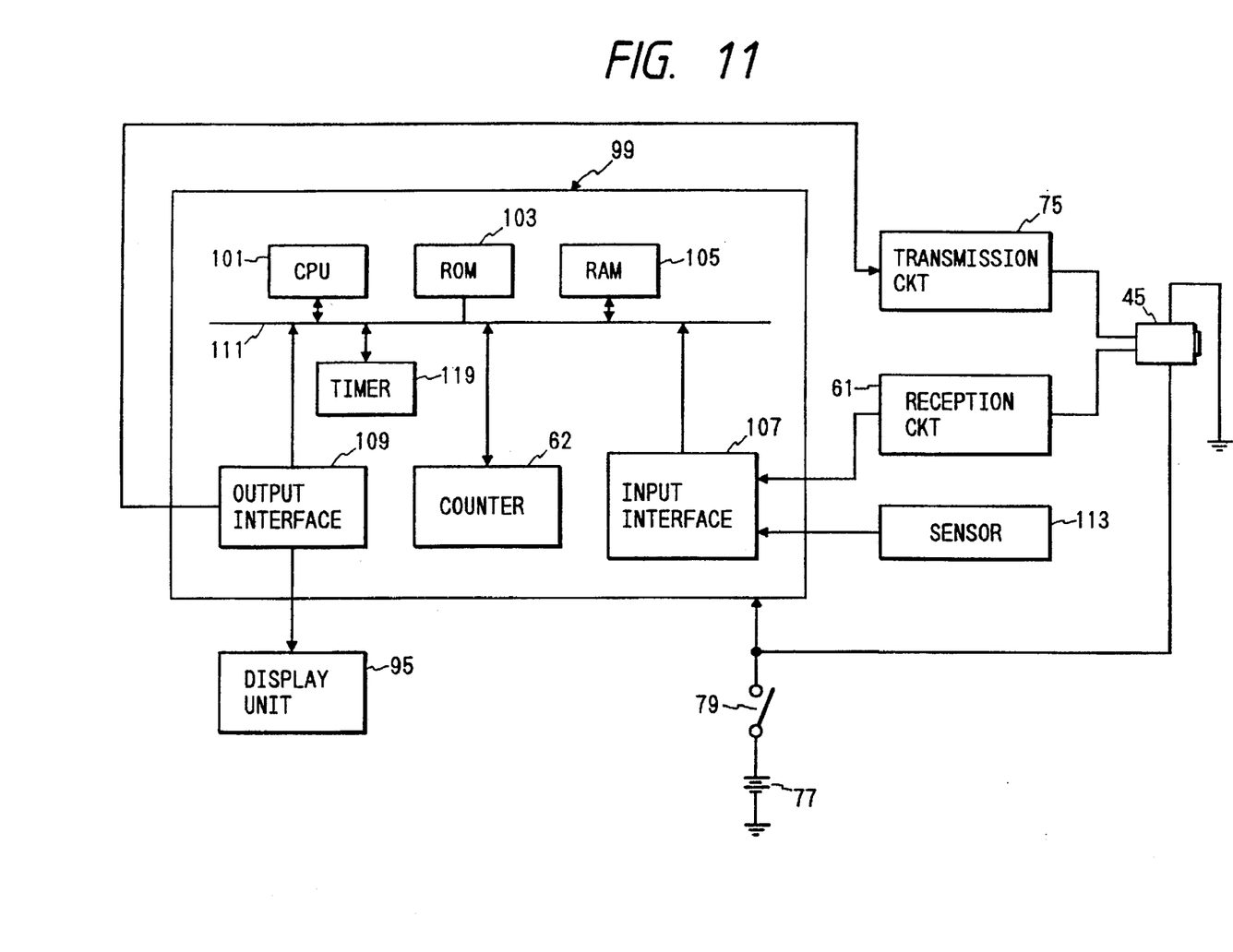
FIG. 11 is a block diagram of a control mechanism employed in the spinning reel for fishing according to the fourth embodiment of the invention.

In FIG. 10, reference character 91 designates a control mechanism storage member for storing a control mechanism shown in FIG. 11. Similarly to the control mechanism storage member 46 employed in the first embodiment, the control mechanism storage member 91 is mounted on the rear portion of a reel main body 93, and a display 95 for displaying the fishing line play-out length is disposed on the surface of the control mechanism storage member 91.

And an ultrasonic sensor 45 is mounted on a mounting leg 97 formed integrally with the reel main body 93 in such a manner that the sensor 45 is opposed to the surface of the fishing line winding diameter portion of the spool 37. Although not shown, similarly to the first embodiment, a resonating member, a shield member and the like are wound round the outer periphery of the ultrasonic sensor 45.

Accordingly, the ultrasonic sensor 45 serves not only as transmission means for an ultrasonic beam onto the surface of the fishing line winding diameter portion of the spool 37 but also as receiving means for receiving a reflected wave reflected from the surface of the fishing line winding diameter portion. And the reception signal of the ultrasonic sensor 45 is input to the control mechanism provided within the control mechanism storage member 91.

Now, FIG. 11 shows a block diagram of the control mechanism stored in the control mechanism storage member 91. In FIG. 11, reference character 99 designates a microcomputer which controls the calculation of the fishing line length, the display of the calculated fishing line length, the writing of data and other operations. The microcomputer 99 includes a CPU 101 which controls and manages a program memory, a data memory and an input/output device to execute the calculation, judgement, and transfer processings necessary to process a job given thereto, a ROM 103 for storing a calculation processing program and the like necessary for the CPU 101, a RAM 105 for storing input data, calculation results obtained in the CPU 101 and the like, an input interface 107 and an output interface 109. These components are connected through a bus 111 to the CPU 101.

Also, in FIG. 10, 113 stands for a sensor which is used to detect the rotation of the rotor 25. The sensor 113 includes a lead switch 115 embedded in the reel main body 93 and a magnet 117 disposed opposed to the lead switch 115 and fixed to the inner peripheral edge of the rotor 25. And, if the rotation pulse of the rotor 25 obtained by turning on the lead switch 115 is input through the input interface 107 to the counter 62, then the counter 62 is allowed to perform its counting operation.

And the ultrasonic sensor 45 is connected through the reception circuit 61 to the input interface 107 and is also connected through the transmission circuit 75 to the output interface 109, whereby a time difference Δt between the time when an ultrasonic beam is emitted from the ultrasonic sensor 45 and the time when the ultrasonic beam is reflected at the surface P of the fishing line winding diameter portion of the spool 37 and the reflected wave thereof is received by the ultrasonic sensor 45 can be measured by a timer 119 incorporated in the microcomputer 99 and can be then stored in a RAM 105.

By means of the time difference Δt, a distance d to a fishing line winding surface stored in the ROM 103 can be calculated according to the following expression:

$$d = (\text{speed of sound } 331[m/sec] \times \tfrac{1}{2}) \times \Delta t$$

In other words, as shown in FIG. 10, if the speed of sound is expressed as v, then the distance d between the ultrasonic sensor 45 and the surface P of the fishing line winding diameter portion can be found according to the following expression:

$$d = \Delta t \times (v/2)$$

Therefore, the distance d can be found by measuring the time difference Δt.

And a fishing line winding diameter D is found by the CPU 101 and the fishing line length can be calculated in such a manner as described later.

Here, referring to the fishing line diameter D, as shown in FIG. 10, if a distance between the ultrasonic sensor 45 and the spool shaft 121 of the spool 37 is expressed as c, then the diameter D can be easily found according to the following expression:

$$D = (c-d) \times 2$$

Next, description will be given below of the fishing line length measuring operation of the present embodiment structured in the above-mentioned manner with reference to a flow chart shown in FIG. 12.

Figure 12:
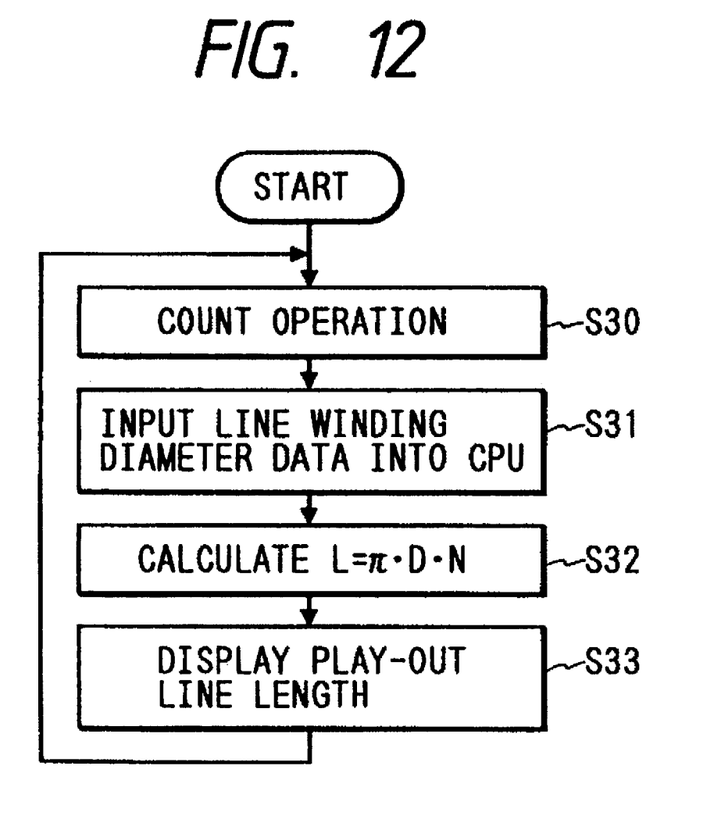
FIG. 12 is a flow chart showing a fishing line play-out length measuring procedure.

If the bail support member 31 is moved from its fishing line play-out position to its fishing line winding position to operate a handle 43 for fishing line winding, then the fishing line 39 is wound round the spool 37 due to the rotation of the rotor 25 and thus a program shown in FIG. 12 is started.

At first, in Step S30, with the rotation of the rotor 25, a pulse signal output from the sensor 113 each time the rotor 25 is revolved is input through the input interface 107 into the counter 62, in which such pulse signals are counted sequentially.

Next, in Step S31, the count content N of the microcomputer 99 is input into the CPU 101, and a voltage corresponding to the fishing line winding diameter D output from the reception circuit 61 is converted into digital data by an A-D converter and the digital data is input to the CPU 101.

Then, in Step S32, calculation of $L = \pi \cdot D \cdot N$ is executed, the calculation result is output through the output interface 109 to the display 95, and the wound length L of the fishing line 39 is digitally displayed sequentially (Step S33).

As described above, in the spinning reel for fishing according to the invention, the timer 119 is used to measure the time between when the ultrasonic beam is emitted from the ultrasonic sensor 45 onto the surface P of the fishing line winding diameter portion and when the reflected wave of the ultrasonic beam reflected from the surface P is received by the ultrasonic sensor 45, and the measured time is converted into an electric signal proportional to the fishing line winding diameter. The play-out length of the fishing line 39 is calculated when the fishing line 39 is wound, in accordance with the fishing line winding diameter data and the detect value of a sensor 111 for detecting the number of revolutions of the rotor 25.

Therefore, according to the present embodiment as well, similarly to the first embodiment of the invention, even when the fishing line diameter varies according to the kind of the fishing line 39, the fishing line length can be measured accurately and thus accuracy in measuring the length of the fishing line 39 can be improved. Moreover, according to the present embodiment, the play-out and winding of the fishing line 39 can be executed smoothly when compared with the conventional spinning reels.

For reference, the present applicants have previously filed Japanese Patent Application No. Hei 3-262155 (japanese Patent Unexamined Publication No. Hei 5-103567) which discloses a fishing line length measuring device for use in a fishing reel. The fishing line length measuring device includes a sensor for detecting the rotation of a spool, an up/down counter for counting pulse signals from the sensor, the up/down counter also for measuring the number of revolutions of the spool when a fishing line is wound up to a prescribed winding diameter level set smaller than the maximum winding diameter of the fishing line to be wound round the spool and the total number of revolutions of the spool corresponding to the whole winding length of the fishing line, memory means for inputting and storing these measurement values, means for calculating the length of the fishing line in accordance not only with a fishing line length calculation expression to be defined by the number of revolutions of the spool up to the prescribed winding diameter level and by the total number of revolutions of the spool but also with the actual number of revolutions of the spool which is revolved when the fishing line is played out and wound, and a display for displaying the fishing line length calculated by the calculation means. Here, if the sensor for detecting the rotation of the spool in the fishing line length measuring device disclosed in our previous patent application is replaced by counting means as in the invention for counting the number of play-outs of a fishing line played out spirally from a spool in accordance with signals from transmission means and receive means, or by revolution number detect means as in the invention for detecting the number of revolutions of a rotor, then the fishing line length measuring device disclosed in our previous patent application can also be used.

As has been described heretofore, according to the inventions as set forth in the respective claims, when compared with the conventional spinning reels for fishing, the fishing line can be played out smoothly and, at the same time, even when the diameter of the fishing line varies according to the kind of the fishing line, the length of the fishing line can be measured accurately to thereby improve accuracy in measuring the length of the fishing line.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A spinning reel for fishing, comprising:

a reel main body;

a handle;

a rotor supported rotatably by said reel main body and rotatable in response to a winding operation of said handle;

a spool;

a fishing line guide device mounted on said rotor for winding a fishing line on said spool in response to a rotation of said rotor when said fishing line guide device is in a fishing line winding position;

transmission means, when said fishing line guide device is switched from said fishing line winding position to a fishing line play-out position, for emitting ultrasonic signals onto the fishing line played out spirally from said spool;

receiving means for receiving the ultrasonic signals reflected from the fishing line;

counting means for counting the number of play-outs of said fishing line played out spirally from said spool in response to said ultrasonic signals;

calculation means for calculating a length of the fishing line played out from said spool according to the number of play-outs counted by said counting means; and means for displaying a representation of the length of said fishing line played out from the spool.

2. A spinning reel as claimed in claim 1, wherein said transmission means and said receiving means comprises a single ultrasonic sensor.

3. A spining reel as claimed in claim 1, wherein said transmission means comprises an ultrasonic transmission sensor and said receiving means comprises an ultrasonic receiving sensor.

4. A spining reel as claimed in claim 1, further comprising a resonating member and and a shield member provided around said transmission and receiving means.

5. A spinning reel as claimed in claim 1, further comprising a memory means for storing data and mode selection means for selecting one of a fishing line diameter input mode whereby a diameter of said fishing line is input into said memory means and a fishing line measuring mode whereby a dimension of said fishing line is measured.

* * * * *